United States Patent [19]
Bozek

[11] 3,757,577
[45] Sept. 11, 1973

[54] HYDRAULIC REMOTE FLUID FLOW INDICATING DEVICE

[76] Inventor: John W. Bozek, 6093 Waterfront Dr., Waterford, Mich. 48095

[22] Filed: Aug. 27, 1971

[21] Appl. No.: 175,639

[52] U.S. Cl. .................................... 73/209, 73/210
[51] Int. Cl. .............................................. G01f 1/00
[58] Field of Search ............................ 73/209, 210; 116/117; 340/239

[56] References Cited
UNITED STATES PATENTS
2,808,580   10/1957   Fuller................................. 340/239
3,247,499    4/1966   Dumpleton........................ 340/239

Primary Examiner—Herbert Goldstein
Attorney—James P. Meloche

[57] ABSTRACT

A device connected to a remote pressure gauge which will activate this gauge when the fluid flow through the device exceeds or diminishes below selective flow rates. The fluid pressure of the flowing fluid being the activating force on the indicating gauge and said fluid pressure being directed to the gauge selectively through holes in a central guide tube which are open or closed to fluid pressure depending on the position of the variable area flowmeter plummet on said guide tube.

7 Claims, 6 Drawing Figures

Patented Sept. 11, 1973
3,757,577
2 Sheets-Sheet 1
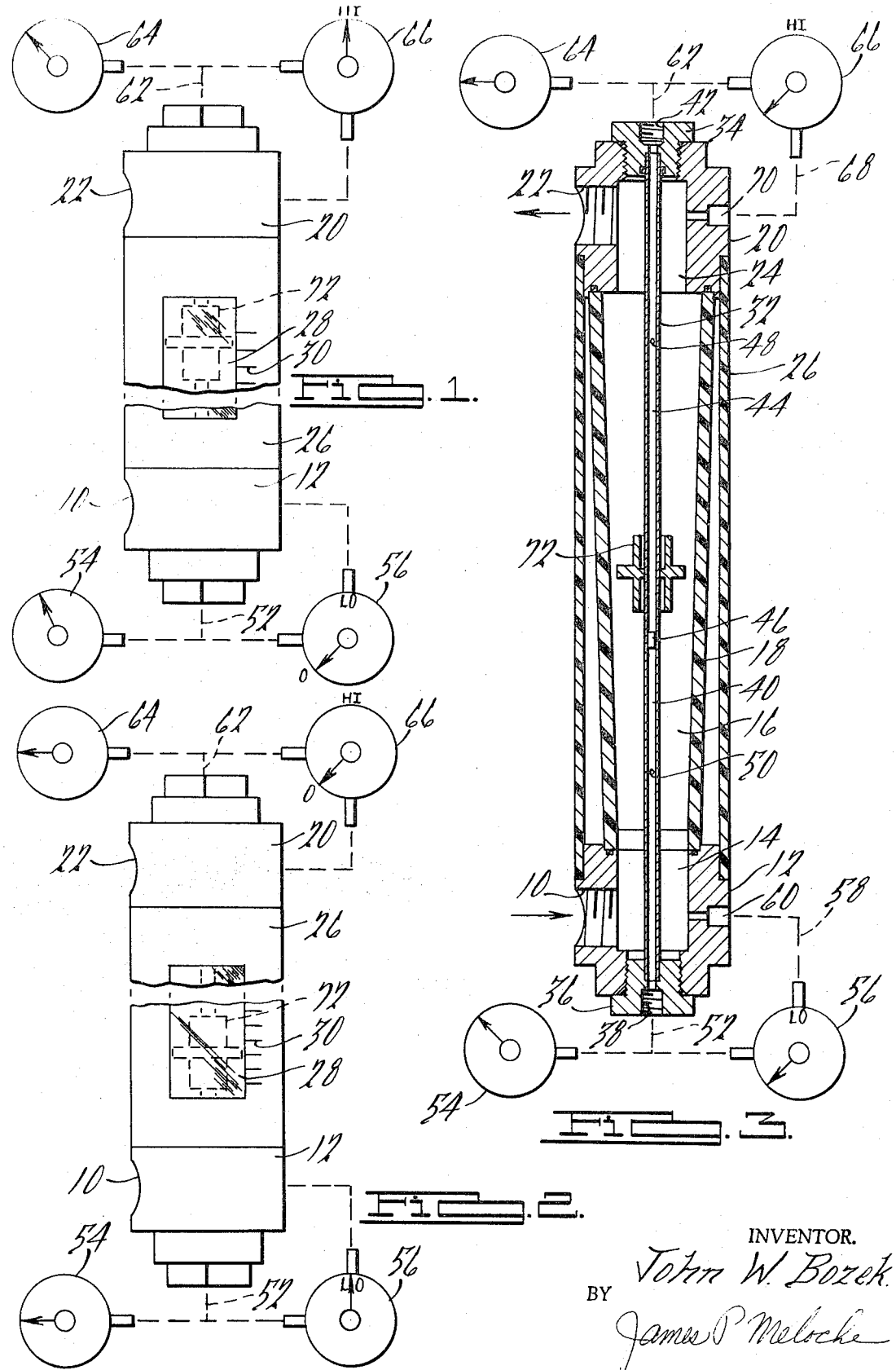
INVENTOR.
John W. Bozek.
BY James P. Meloche
ATTORNEY.

Patented Sept. 11, 1973
3,757,577
2 Sheets-Sheet 2
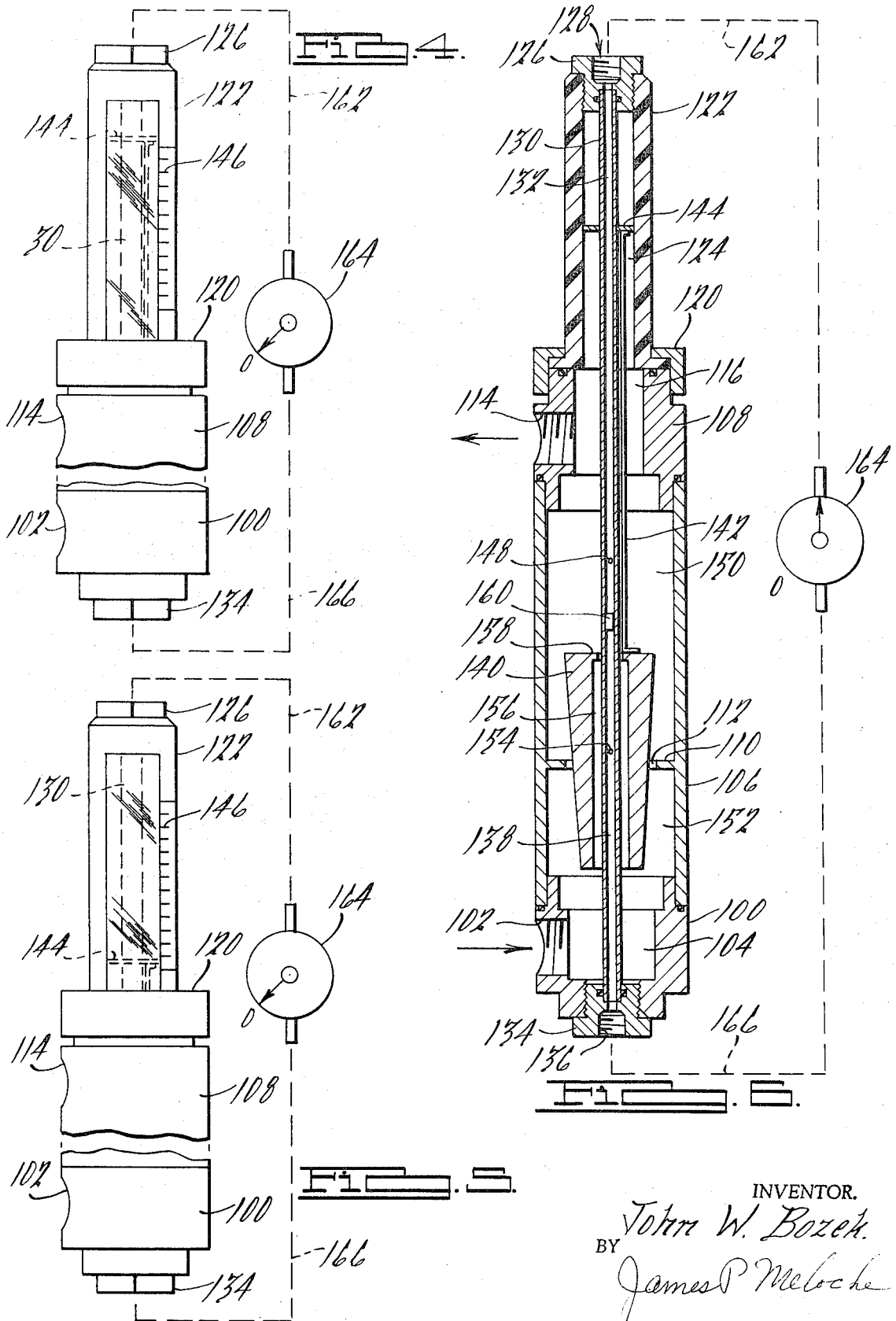
INVENTOR.
John W. Bozek.
BY James P. Meloche
ATTORNEY.

HYDRAULIC REMOTE FLUID FLOW INDICATING DEVICE

BACKGROUND OF THE INVENTION

This invention relates to the field of hydraulic devices for indicating the fluid flow rate remote from the point at which the fluid flow is being measured. The device is primarily concerned with measuring the exceeding of certain flow rates rather than a continuous measurement of each flow rate.

Many devices have been used in combination with variable area flowmeters to remotely indicate the position of the plummet in the flowmeter thereby remotely indicating the flow rate. These devices have normally electrical contacts or magnetic inserts connected to the plummet and the position of the plummet is read by an outside follower as shown, for example, in U.S. Pat. No. 3,143,881.

The present invention being completely hydraulic and utilizing only the energy of the flowing fluid is, therefore, free of the dependency on electrical apparatus for its reading.

SUMMARY OF THE INVENTION

The invention may be summarized as a new and novel construction of variable area flowmeters of the type utilizing a weighted plummet which seeks an equilibrium position in a vertically upward flowing fluid being measured. These variable area flowmeters are sometimes called constant pressure drop flowmeters and more particularly may be labeled as a plummet in a tapered tube or, as a tapered plug in an orifice; for example, the variable area flowmeters of this invention utilize a central guide tube. Central guide rods or wires have been used before as a means of stabilizing the plummet and maintaining its concentric position in the flowmeter, as shown in U.S. Pat. Nos. 2,348,733 and 2,350,343 of K. Fischer. In this invention the central guide tube comprises a hollow tube and fluid pressure from the flowmeter is permitted to pass into a port in the guide tube and from thence to a pressure gauge connected to the guide tube at another point. When the plummet is below the port in the guide tube, the fluid pressure that is sensed by this port will be that fluid pressure that is downstream from the plummet which is lower than the pressure that is upstream from the plummet. When the plummet passes over the port, then the port senses the pressure that is upstream from the plummet and the gauge indicates this change. A high and a low limit reading is obtained by having a plug in the guide tube and providing a port for the high limit and another port for the low limit with the plug between them. A pressure gauge is provided to read the fluid pressure inside of the tube at the high end and another pressure gauge is provided to read the pressure inside of the tube at the low end.

With the foregoing brief summary in view, together with such other objects and advantages as may subsequently appear, the invention resides in the parts and in the combinations; construction and arrangement of parts hereinafter described and claimed, and illustrated by way of example in the accompanying drawings, in which:

BRIEF DESCRIPTION OF THE DRAWINGS

FIG. 1 is a side plan view, with the center portion broken out to shorten the figure, showing the plummet in a tapered tube type flowmeter modified according to this invention, showing the meter readings for an excessively high rate of flow.

FIG. 2 is the same plan view as the meter of FIG. 1 showing the conditions of the meter for an excessively low rate of flow.

FIG. 3 is a cut-away view of the full length meter shown in FIGS. 1 and 2 to show the relationship of the working parts and to show the conditions of the meter gauges for a normal rate of flow.

FIG. 4 is a side plan view, with the center portion broken out to shorten the figure, of a tapered plug in an orifice type flowmeter modified to practice this invention and showing the condition of the meter having an excessively high rate of flow.

FIG. 5 is the same view as the meter of FIG. 4 to show the condition of the meter for an excessively low rate of flow.

FIG. 6 is a full length cut-away view of the meter shown in FIGS. 4 and 5 to show the relationship of the working parts and to indicate the meter readings at a normal rate of flow.

DESCRIPTION OF THE PREFERRED EMBODIMENTS

As best viewed in FIGS. 1, 2, and 3 a fluid inlet, 10, is provided in base, 12, whereby inflow fluid passes into chamber, 14, thence into chamber, 16, which is formed by tapered tube, 18, mounted in fluid tight relationship on top of base, 12. Top, 20, is provided with a fluid outlet, 22, which receives the fluid from chamber, 24, after it has passed through chamber, 16. An outer cylindrical housing, 26, is fastened between top, 20 and base, 12, as a protective covering and to hold top, 20, and base, 12, and tapered tube, 18, together in fluid tight relationship. Cover, 26, has a window, 28, to view the position of the plummet in the tapered tube, 18. Scale markings, 30, may be provided on the window, 28, to calibrate flow rates in the usual manner. A central guide tube, 32, is secured fluid tight into cap, 34, which is threaded fluid tight into top, 20. Tube, 32, is also secured fluid tight into cap, 36, which is threaded fluid tight into base, 12, thereby holding guide tube, 32, concentric with tapered tube, 18. Fluid passage, 38, passes through cap, 36, to the interior chamber, 40, of guide tube, 32, and fluid passageway, 42, passes through cap, 34, to the inside chamber, 44, of guide tube, 32, and a fixed solid plug, 46, separates chamber, 44, from interior chamber, 40, in guide tube, 32. A port, 48, is provided in guide tube, 32, communicating from chamber, 16, to chamber, 44. A port, 50, is provided in guide tube, 32, communicating from chamber, 16, to chamber, 40, in guide tube, 32.

A conduit, 52, leads from passageway, 38, to pressure gauge, 54, and pressure drop gauge, 56. A conduit, 58, leads from pressure drop gauge, 56, to port, 60, which passes through into chamber, 14. A conduit, 62, leads from passageway, 48, to pressure gauge, 64, and pressure drop gauge, 66. A conduit, 68, leads from pressure drop gauge, 66, and into chamber, 24, through port, 70. It will be understood that pressure gauge, 54, will read gauge pressure inside of chamber, 40, and pressure drop gauge, 56, will read the pressure differential between chamber, 40, and chamber, 14. It will also be understood that pressure gauge, 64, reads gauge pressure in chamber, 44, while pressure drop gauge, 66, reads the pressure differential between chamber, 44, and chamber, 24.

A plummet, 72, is freely slideable up and down on the outside of guide tube, 32, and at its midpoint fits around guide tube, 32, with sufficient clearance to prevent binding. Fingers which slideably engage guide tube, 32, may be provided at the upper and/or lower end of the plummet to maintain its alignment. The size, shape and weight of the plummet will be selected to cooperate with the tapered tube and fluid being measured.

The operation of the device will be explained first of all for a normal flow rate as illustrated in FIG. 3. The fluid being measured flows into inlet, 10, through chamber, 14, into chamber, 16, raising plummet, 72, continuing on through chamber, 16, into chamber, 24, and out the outlet, 22. There is a pressure drop in the fluid which occurs across plummet, 72, and this pressure drop is essentially constant regardless of the position of plummet, 72. In the normal flow condition illustrated in FIG. 3, port, 50, receives the pressure in chamber, 16, below plummet, 72, and this pressure is recorded on gauge, 54, as a certain positive value. Gauge, 56, reads the pressure in chamber, 40, and compares it to the pressure in chamber, 14, and these pressures being very nearly equal, gauge, 56, essentially reads zero. When the fluid flow decreases sufficiently, as is illustrated in FIG. 2, plummet, 72, moves down on guide tube, 32 to a new equilibrium position and when plummet, 72, passes over port, 50, port, 50, now senses the pressure downstream of plummet, 72. Therefore, pressure gauge, 54, indicates a lower pressure and pressure gauge, 56, indicates the difference in pressure between chamber, 14, and the downstream side of the plummet. Gauge, 56, or 54 may be used alone; however, gauge, 56, due to the points at which it is connected, will give a zero reading or a positive reading only and will not vary with the flow rate. If gauge, 54, is made very sensitive, it may vary over a range of flow rates but the greatest change will occur when the plummet passes over port, 50.

Referring again to FIG. 3, when the flow is normal, port, 48, will read the pressure in chamber, 16, on the downstream side of plummet, 72. This pressure will be nearly the same as the pressure in chamber, 24, and this pressure will be transmitted to gauge, 64, indicating the pressure value; however, gauge, 66, which reads the difference between chamber, 24, and chamber, 44, will indicate zero. When the fluid flow increases sufficiently as shown in FIG. 1, the plummet, 72, will rise and when it passes port, 48, chamber, 44, will receive the pressure upstream of plummet, 72, and gauge, 64, will thus record this higher pressure and gauge, 66, will indicate the pressure differential existing between chamber, 24, and chamber, 44. The user of this device, therefore, is able to get a positive indication through gauge, 64, or 66 when the flow rate exceeds the rate selected to be indicated at port, 48, or falls below the flow rate selected for the position of port, 50. The use of gauges, 56, and 66 would be preferred since they are unaffected by the overall flow rate and only give a reading when the condition exists that they are selected for, since this reading always equals the pressure across the plummet providing an indication in the nature of a binary on or off gauge. The overall flow rate may, therefore, be regulated by either manual or automatic devices to raise or lower the flow rate as indicated by these warning gauges. For a particular design of the tapered tube and plummet and a certain fluid the ports, 48, and, 50, may be located at such a position as selected to indicate the desired flow limits.

The second embodiment will be explained referring to FIGS. 4, 5 and 6. FIG. 6 shows a base, 100, having an inlet, 102, and an internal chamber, 104. Cylindrical wall, 106, is secured to base, 100, in a fluid tight manner and is also secured to top, 108, in a fluid tight manner. An orifice plate, 110, is mounted horizontally on wall, 106, being provided with an orifice hole, 112. Top, 108, is provided with an outlet, 114, and an interior chamber, 116, and is fastened fluid tight by threaded cap, 120, to sight glass, 122. A threaded cap, 126, having a bore, 128, is fastened fluid tight to the top of sight glass, 122, and a guide tube, 130, is secured in cap, 126, in a fluid tight manner so that bore, 128, communicates to chamber, 132, inside of tube, 130. A threaded cap, 134, is fastened fluid tight into base, 100, and is provided with a bore, 136. Tube, 130, is secured in cap, 134, in a fluid tight manner providing a passageway from bore, 136, into chamber, 138, of tube, 130. Tube, 130, is concentric with sight glass, 122, and orifice hole, 112, and provides a guide for tapered plug, 140. Tapered plug, 140, is free to move up and down on guide tube, 130. A rigid rod, 142, extends from the tapered plug, 140, to washer, 144, which acts as the visible indicator, for the position of tapered plug, 140. As plug, 140, moves up, indicator, 144, moves up and its position may be read on scale, 146, which will indicate the flow rate when calibrated.

Guide tube, 130, is provided with a port, 148, which communicates between chamber, 150, and chamber, 132. Chamber, 150, and chamber, 152, are separated by the orifice plate, 110, and the pressure in chamber, 150, is lower than the pressure in chamber, 152, by the amount of the pressure drop designed into the tapered plug and orifice for each particular application. As shown in FIG. 6, port, 154, leads from chamber, 138, into chamber, 156, which opens into chamber, 152. Clearance of chamber, 156, at its top end closely engages guide tube, 130, to provide a suitable fluid seal and chamber, 156, extends between tube, 130, and tapered plug, 140, and is closed by lips, 158, but is open to chamber, 152, at the bottom of plug, 140. Suitable perforated guide fingers which are not shown may be connected to plug, 140, to ride on guide tube, 130, to maintain alignment, A fixed solid plug, 160, is secured inside of tube, 130, to divide chamber, 132, from chamber, 138.

A conduit, 162, carries fluid pressure from bore, 128, to one side of gauge, 164, and a conduit, 166, conducts fluid pressure from port, 136, to the other side of gauge, 164. In the flow configuration shown in FIG. 6, the pressure from chamber, 150, passes through port, 148, through chamber, 132, through port, 128, through conduit, 162, to gauge, 164. The pressure from chamber, 152, passes through chamber, 156, through port, 154, through chamber, 138, through port, 136, through conduit, 166, to the other side of gauge, 164. The pressure in chamber, 152, being higher than the pressure in chamber, 150, gauge, 164, indicates this pressure differential. This pressure differential will remain essentially constant regardless of the flow rate until the flow rate exceeds either the high or the low limit.

As seen in FIG. 5, when the flow rate decreases below the low limit, tapered plug, 140, moves lower in orifice, 110, and lips, 158, pass below port, 154. The pressure from chamber, 150, therefore, enters port, 154, as well as port, 148, and thus a zero pressure differential is indicated on pressure gauge, 164, alerting the user that the flow rate is out of its limit.

As illustrated in FIG. 4, when the flow rate increases above the prescribed high limit the plug, 140, moves higher relative to orifice, 110, and when the lips, 158, rise above port, 148, then the fluid pressure from chamber, 152, enters port, 148, thereby causing gauge, 164, to indicate a zero pressure differential between port, 148, and port, 154. The user is, therefore, alerted that the flow rate is out of its limits.

It is also contemplated in this invention that the gauge arrangement illustrated in FIGS. 4, 5, and 6 could also be applied to the meters of FIGS. 1, 2 and 3 and that the gauge arrangements in FIGS. 1, 2, and 3 could be applied to meters illustrated in FIGS. 4, 5, and 6.

It will be understood that other types of pressure transducers could be used in place of the gauges shown. These alternate devices could be used to trigger visual or aural alarms, actuate valves, turn off pumps, or in other ways affect the associated system.

I claim,

1. A device for remotely indicating the rate of flow of fluid comprising:
   a variable area flowmeter device including a fixed member and a moveable member; and
   a guide tube, provided with at least one inner chamber, secured to said fixed member, for guiding said moveable member; and
   a hole in said guide tube in each inner chamber leading from the interior to the exterior, thereof, and located within the range of travel of the movable member; and
   a separate pressure indicating means connected to each inner chamber of said guide tube whereby the position of the movable member relative to the hole determines whether the inner chamber is substantially at the pressure upstream or downstream of the moveable member.

2. A device for remotely indicating the rate of flow of fluid as set forth in claim 1, wherein:
   the fixed member includes a base for fluid inlet; and an
   upwardly tapering tube; and
   a top for fluid outlet; and
   the moveable member is a cored p'ummet.

3. A device for remotely indicating the rate of flow of fluid as set forth in claim 1, wherein:
   the fixed member includes a horizontal orifice plate disposed between an inlet member and an outlet member; and
   the moveable member includes a tapered plug.

4. A device for remotely indicating the rate of flow of fluid as set forth in claim 1, wherein:
   said guide tube is provided with two inner chambers; and
   said hole is provided in each chamber wall.

5. A device for removely indicating the rate of flow of fluid as set forth in claim 4, wherein:
   said separate pressure indicating means are replaced by a single pressure drop gauge connected on one side to one chamber and on the other side to the other chamber.

6. A device for remotely indicating the rate of flow of fluid as set forth in claim 1, wherein:
   said separate indicating means is connected between said chamber and said flowing fluid.

7. A remote fluid flow indicating device comprising:
   a fluid inlet and a fluid outlet vertically disposed having the fluid inlet below the fluid outlet, and
   a vertically outwardly tapering tube between said fluid inlet and said fluid outlet, and
   passageways for said fluid to flow from said inlet up through said vertically upward tapering tube and out said outlet, and
   a guide tube secured to said inlet and outlet and concentric with said upward tapering tube, and said guide tube having an interior chamber leading to the outside of said inlet and also leading to the outside of said outlet, and
   a fixed plug inside of said guide tube, and
   a hole leading from the inside of said guide tube to the outside of said guide tube below said plug, and
   a second hole leading from the inside of said guide tube to the outside of said guide tube above said plug, and
   a pressure drop gauge connected to read the pressure drop between the inside of said guide tube above said plug and said outlet, and a second pressure gauge connected to read the pressure difference between the inside of said guide tube below said plug and said inlet, and
   a weighted member slideably affixed to said guide tube for measuring the rate of fluid flow upward through the tapered tube, and
   said holes being within the range of travel of the said slideable weighted member.

* * * * *